United States Patent
Kobayashi et al.

(10) Patent No.: US 7,251,724 B2
(45) Date of Patent: Jul. 31, 2007

(54) DEVICE ENVIRONMENT CONFIGURATION SYSTEM AND METHOD, AND DATA STORAGE THEREFOR

(75) Inventors: Atsushi Kobayashi, Maruko-machi (JP); Sachie Shizuka, Tobu-machi (JP); Toshiyuki Sugimoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1285 days.

(21) Appl. No.: 10/034,192

(22) Filed: Dec. 26, 2001

(65) Prior Publication Data

US 2002/0095310 A1 Jul. 18, 2002

(30) Foreign Application Priority Data

Jan. 9, 2001 (JP) ............................. 2001-001858

(51) Int. Cl.
*G06F 9/24* (2006.01)

(52) U.S. Cl. ........................... 713/1; 715/735; 717/130
(58) Field of Classification Search ...................... None
See application file for complete search history.

(56) References Cited

U.S. PATENT DOCUMENTS 5,546,595 A * 8/1996 Norman et al. ............... 710/10
5,748,980 A * 5/1998 Lipe et al. ..................... 710/8
5,999,730 A 12/1999 Lewis
6,237,092 B1 * 5/2001 Hayes, Jr. .................... 713/100
6,304,885 B1 * 10/2001 Savage et al. ............... 715/500
6,724,409 B1 * 4/2004 Maddocks et al. .......... 715/853

FOREIGN PATENT DOCUMENTS

| EP | 0 421 615 | 9/1990 |
| JP | 05-324532 | 12/1993 |
| WO | 95/17715 | 6/1995 |

\* cited by examiner

*Primary Examiner*—Thuan Du
(74) *Attorney, Agent, or Firm*—Hogan & Hartson LLP

(57) ABSTRACT

A device environment configuration apparatus and method for defining a device profile containing setup information for a device according to how the device is connected to a system such as a POS terminal system. Device profiles are displayed according to how the various devices in the system are connected. Device profiles are inputted for setting the OPOS device environment configuration settings in a registry to match how the devices are connected in the POS terminal system. A device profile editor relates the input data to a device profile previously stored in the OPOS device environment configuration settings so that a particular device profile can be edited. A device profile verification unit verifies whether the edited profile is appropriate based on the OPOS device environment settings. Based on the edited profile data, a device profile updating unit then updates the OPOS device environment configuration settings in the registry.

30 Claims, 20 Drawing Sheets (a)
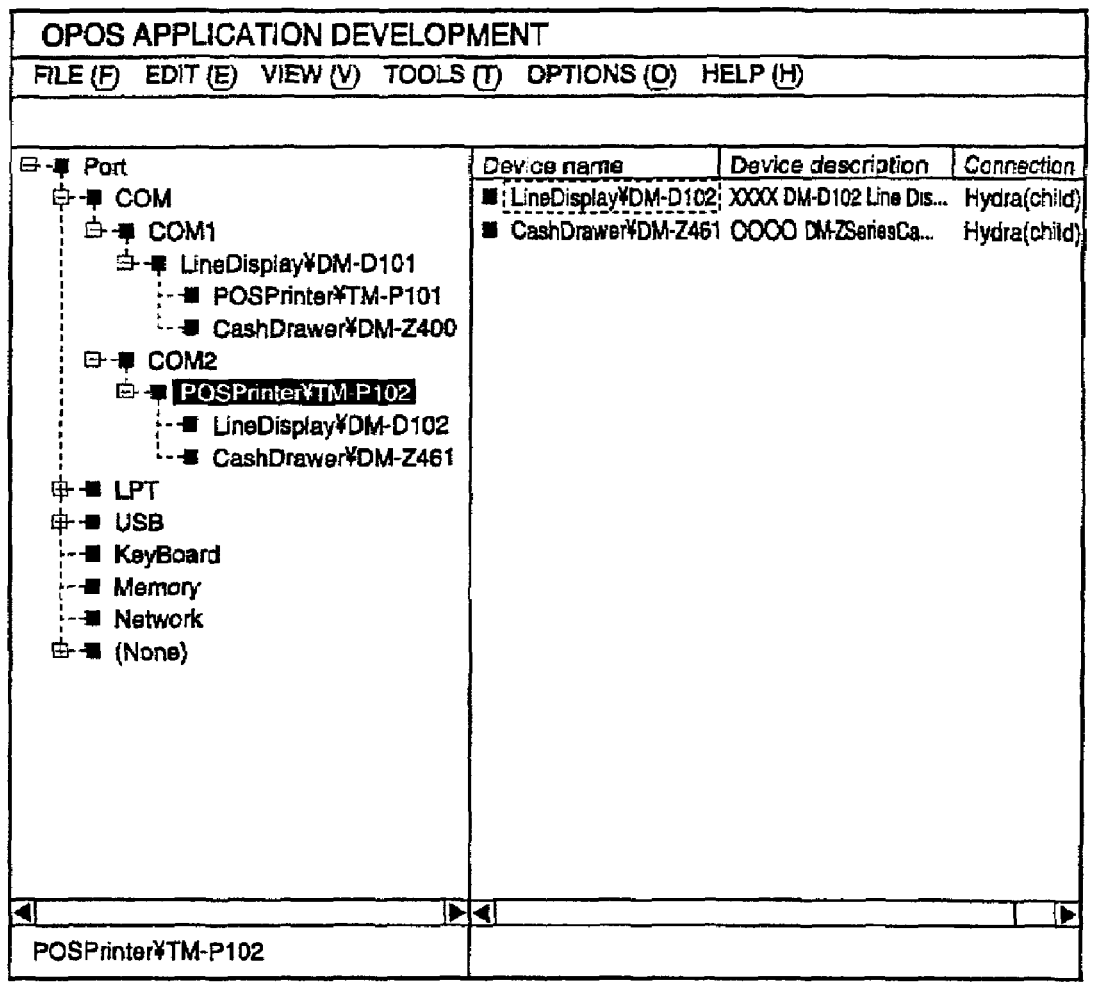
(b)
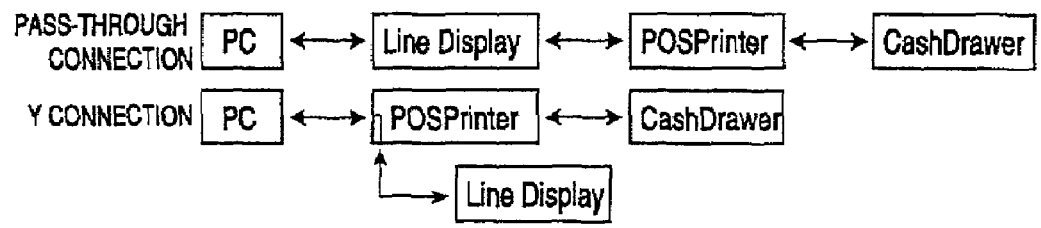
FIG. 12

ADD DEVICE: Select device

Add device

Select the device to add (D)
[TM-H5000 II M ▼]

☐ Ver1 x Display  ☑ Ver2 x Display

Device description
[XXXX TM-H5000 II M POS Printer]

INF file name
[C¥PROGRA~1¥OPS¥XXXXX2¥PpH5k2M.INF]  [reference(R)]

Select the model (M)
[TM-H5000 II M ▼]

Port used
[COM ▼]

Add logical device name
Please select a logical device name (max. 16 characters)(L)

*A logical device name is not required.
Leave blank if name is not specified.
A logical device name can be added later.

[Unit1]

[<BACK>(B)] [NEXT (N)>] [CANCEL] [HELP]

ADD DEVICE: Communication parameters

Select network(N)

[0.0.0.0]   Devices using the port(G)
[Update(U)]  [(none) ▼]

Port profile

| | | | |
|---|---|---|---|
| Rate(R) [▼] | Input buffer size(I) [ ] |
| Bit length(L) [▼] | Output buffer size(O) [1024] |
| Parity(Y) [▼] | Output interval(V) [2500] msec |
| Stop bit(T) [▼] | Input sleep time(E) [ ] msec |
| Handshake(D) [▼] | |

[Interactive CheckHealth(C)]   [Set device name(S)]

[<BACK>(B)] [FINISH (F)] [CANCEL] [HELP]

FIG. 18

ADD NEW LOGICAL DEVICE NAME

Select device class(D)
POSPrinter ▼
Select device name key(K)
TM-H6000M ▼
Input a Logical device name (max. 16 characters)(L)

| CONTINUE(C) | OK | CANCEL | HELP(H) |

FIG. 19

BATCH SETTING

Select PC(S)
IM-310 ▼
Select POS printer(P)
TM-T88IIRM ▼
Select LineDisplay(L)
DM-D102-015 ▼
Select MSR(M)
DM-MR111-102 ▼
Select KeyLock(K)
IM-310 ▼
Select HardTotals(T)
IM-310 ▼

| OK | CANCEL | HELP |

FIG. 20

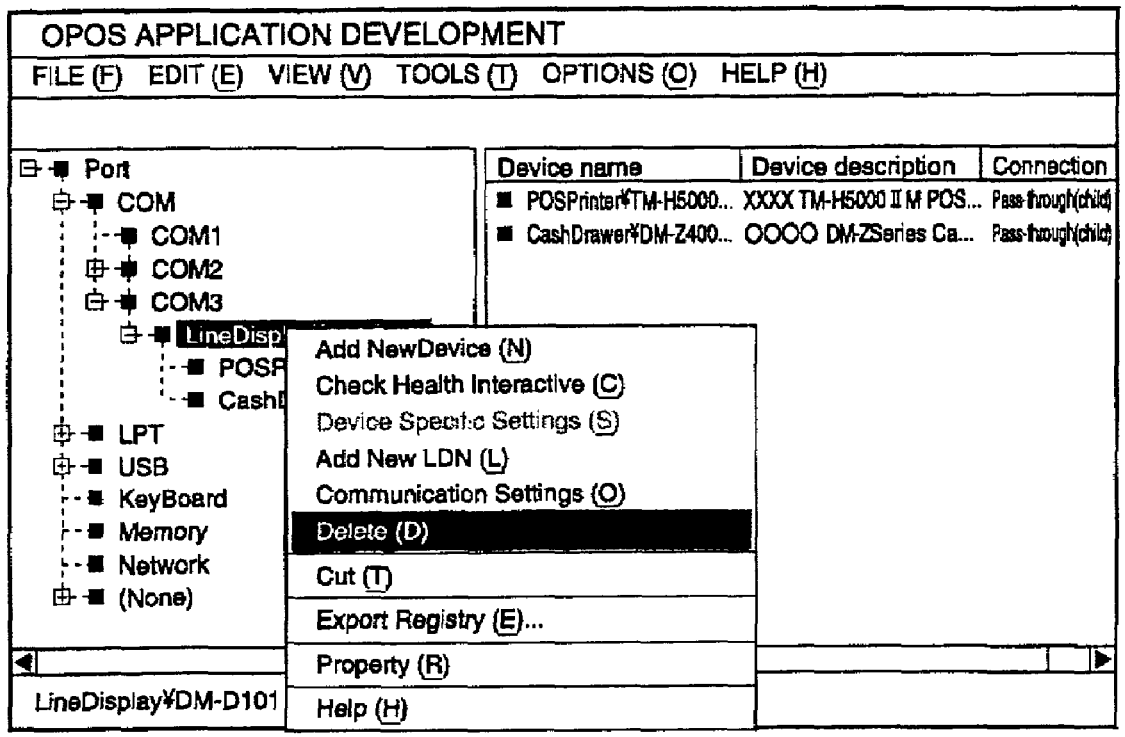
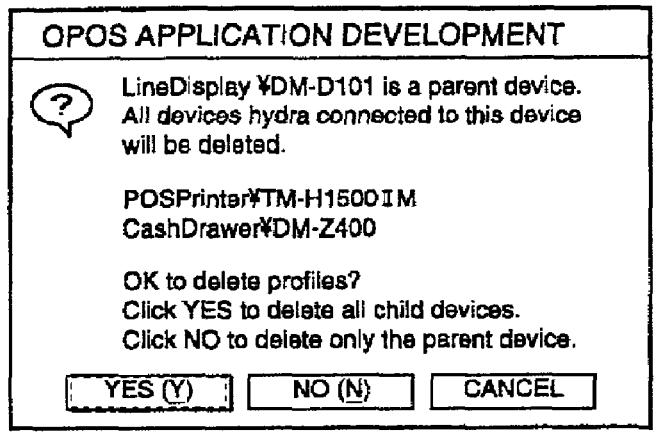
FIG. 22

DEVICE ENVIRONMENT CONFIGURATION SYSTEM AND METHOD, AND DATA STORAGE THEREFOR

BACKGROUND OF THE INVENTION

1. Field of the Invention

The present invention relates generally to a device environment configuration system, a device environment configuration method, and a data storage medium recording the same. More particularly, the invention relates to a device environment configuration system, to a device environment configuration method, and to a data storage medium recording the device environment configuration method for displaying in an easily readable manner device profiles included in the system configuration information managed by the operating system (OS) based on how the devices are connected within the system configuration.

2. Description of Related Art

A multifunction POS (point-of-sale) system can be assembled without the user being aware of the makes and models of devices in the POS system configuration by using a standard Application Program Interface (API) to develop an application providing the POS system functions. OPOS (OLE for Retail POS) is an international standard defining a standard interface for devices (such as printers and displays) used in the POS terminals of a POS system (referred to below as a POS terminal system). An OPOS standard object uses OLE (Object Linking and Embedding) control supported by the Windows (R) OS used on the host devices of the POS system to provide application developers with a set of API functions that make application development easier.

The information needed to use OPOS, that is, information about all of the devices in the POS terminal system and settings for all of the devices (referred to below as the OPOS device environment configuration settings), is stored in a database (referred to below as a registry) of system configuration information managed by the Windows OS. This registry is a database for centrally managing all settings related to computer operation, including all device driver settings and application settings. Device information including a device identifier and various settings stored in the registry as part of the OPOS device environment configuration settings is referred to below as the device information or the device profile. In other words, the OPOS device environment configuration settings include device information for each device in the system configuration.

A registry editor, utility software for editing the registry, is typically used to save OPOS device environment configuration settings for a device in the POS terminal system to the registry. The Windows OS provides a registry editor utility, called regedit.exe, for this purpose.

The registry editor, however, only provides simple basic functions. This makes editing the OPOS device environment configuration settings for each device in the POS terminal system and saving the settings to the registry a cumbersome, time-consuming task. More specifically, it is difficult to edit and save the OPOS device environment configuration settings while also considering the configuration of all other devices in the POS terminal system. Yet further, it is difficult to determine and confirm the appropriateness of the edited OPOS device environment configuration settings so that the appropriate settings can be saved in the registry. It is also difficult to edit and save the OPOS device environment configuration settings with consideration for how the different devices in the POS terminal system are connected to each other.

As noted above the registry is a central database of system configuration information managed directly by the OS, making it difficult for someone without sufficient knowledge to edit the registry. Furthermore, inappropriately changing registry content could render the OS, applications, or devices unusable or interfere with normal operation. Inadvertently changing data other than the OPOS device environment configuration settings could also cause problems with the system.

SUMMARY OF THE INVENTION

This invention is therefore directed to a solution for these problems, and an object of this invention is to provide a device environment configuration system having means for displaying device profiles included in the system configuration data managed by the OS based on how the devices in the system are connected and means for writing device settings appropriate to how a device is connected in a device profile of the system configuration data.

We have researched solutions for the problems described above. As a result we discovered that a POS system developer can easily understand how devices in the POS terminal system are connected with the aid of a displayed device tree organized by, for example, device class and connection port based on the OPOS device environment configuration settings stored in the registry. We developed a method and apparatus that display a detailed profile for a selected device through a simple operation by using an object properties function.

We developed a method and apparatus that enable the OPOS device environment configuration settings to be easily edited by, for example, using a set-up wizard to add all required settings to the device profiles of the devices in the POS terminal system; batch adding information for all devices in a POS terminal system integrating a host computer with peripheral devices; changing device information using a drag-and-drop function to simply move all device information for the device connected to the port where dragging starts so that the device is reconnected to the port where the device information is dropped; and changing or deleting information for a specified device and the information for all devices connected to the specified device based on how the specified device is connected.

To achieve the above and other objects of the present invention, an apparatus is provided for configuring a device environment for a system of one or more connected devices, each device having a device profile, the system running an operation system (OS). The apparatus comprises a device profile display controller for generating a display, based on a connection status of one or more devices in the system, of device profiles from system configuration information managed by the system OS in selected display groups, and a device profile setting section for writing a device profile for a device to the system configuration information so that the profile corresponds to the connection status of the device.

The device profile setting section preferably includes an input/output controller for inputting information to be written to a device profile in the system configuration information based on connections of the devices displayed by the device profile display controller; a device profile editor for editing the device profile based on information inputted by the input/output controller; a device profile verification unit for verifying the device profile edited by the device profile editor; and a device profile updating unit for updating a device profile in the system configuration information according to the device profile to be stored in registry.

Preferably, the device profile display controller displays one or more devices in the system in a device tree format according to selected display groups. In this case the devices are preferably organized by device class or connection port.

Preferably the device profile display controller displays device profile for the device categorized by parameter types using display tabs, for example.

Preferably, the device profile editor comprises a device profile generating section for adding a new device profile including a device identifier specifying a device in the system, and device communication parameters; a device profile changing section for changing the device identifier and device communication parameters set in the device profile added to the system configuration information by the device profile generating section; and a device profile deleting section for deleting the device profile added by the device profile generating section from the system configuration. The device identifier specifying a particular device added by the device profile generator is preferably a logical device name for the device.

Preferably, the device profile generating section adds the new device profile for a device in a specific sequence by using a software wizard, for example.

Preferably, the device profile generating section can batch add devices to a system integrating plural devices of different device classes.

Preferably, the device profile deleting section can delete all devices connected to a selected device based on the connection status of the selected device.

Preferably, the device profile changing section can batch change the connection of a selected device connected to a port from which it is moved and the connection of all devices connected thereto to a port to which the selected device is moved.

Preferably, the device profile changing section can change only a selected setting for a device. The selected setting in this case is further preferably a device communication parameter or the logical device name of the device.

In another aspect, the invention is a method for configuring a device environment with the operation and effects as described above. In yet another aspect, this device environment configuring method can be provided as a computer-executable program, and the program can be recorded to and distributed on such data storage media as a Compact Disc (CD), a floppy disc, a hard disc, a magneto-optical disc, a Digital Versatile Disc, a magnetic tape, or a semiconductor memory, or transmitted by a carrier wave over a communication channel.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 12(a) is an example of connection port display tree, and FIG. 12(b) shows a pass-through connection and a Y connection;

FIG. 17 shows a device selection screen;

FIG. 18 shows a screen for setting communication parameters;

FIG. 19 shows a screen for adding a logical device name;

FIG. 20 shows a screen for batch registering devices;

FIG. 22 shows deleting a hydra connected device; and

DESCRIPTION OF THE PREFERRED EMBODIMENTS

A device environment configuration system according to embodiments of the present invention has a device profile setting section for writing a device profile for a particular device to system configuration information (i.e., registry) so that the profile corresponds to the device connection status by displaying, based on the connection status of one or more devices in the system, device profiles from the system configuration information managed by the system OS in selected display groups.

Preferred embodiments of the present invention are described below with reference to the accompanying figures. It will be noted that the following embodiments are shown by way of description only and shall not limit the scope of the invention. It will be obvious to one with ordinary skill in the related art that various alternative embodiments can be achieved by replacing some or all of the elements described below with equivalent elements, and that all such variations are included in the scope of this invention.

Figure 1:
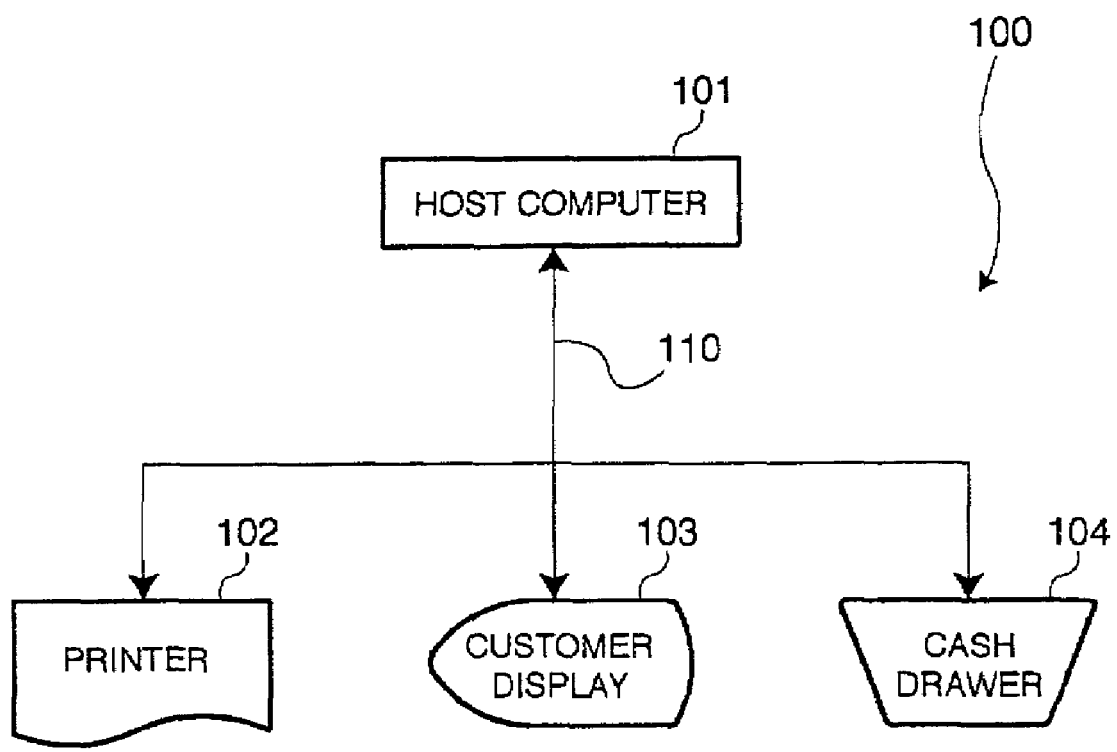
FIG. 1 shows the configuration of a POS terminal system.

FIG. 1 shows the configuration of a typical POS terminal system 100. This POS terminal system 100 comprises a host computer 101, printer 102 for printing receipts and a transaction journal, customer display 103 for displaying purchase information, and cash drawer 104 for holding money and checks. The host computer 101 stores a software application providing various functions of the POS terminal system 100. The host computer 101 is connected by a communication bus 110 to the printer 102, the customer display 103, and the cash drawer 104. Various communication protocols can be used on the communication bus 110, including serial, parallel, and network (such as IEEE (Institute of Electrical and Electronic Engineers) 802).

Figure 2:
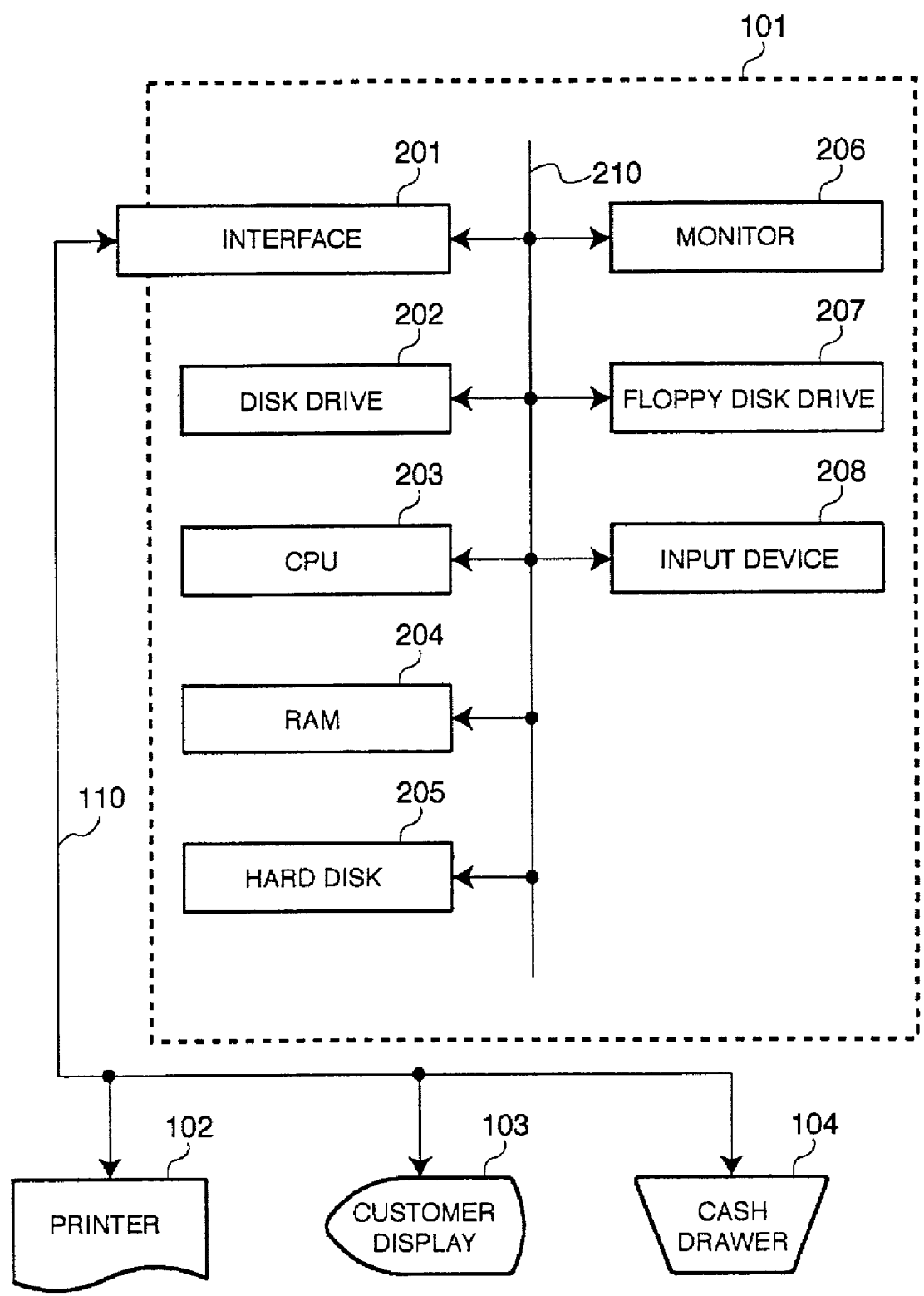
FIG. 2 is a block diagram of the POS terminal system.

FIG. 2 is a block diagram of a host computer 101. The host computer 101 has an interface 201 for connecting to the communication bus 110, a disk drive 202 for reading software and information from a CD (Compact Disc) or other medium, a CPU 203, RAM 204 for storing the program run by the CPU 203 and used as working memory by the CPU 203, a hard disk 205 storing the program and data used by the CPU 203, a monitor 206 or other type of display device for presenting messages and information for the user, a floppy disk drive 207 for reading software and other information from a floppy disk, a keyboard and mouse or other type of input device 208 enabling user input to the system, and a bus 210 connecting these various components.

Figure 3:
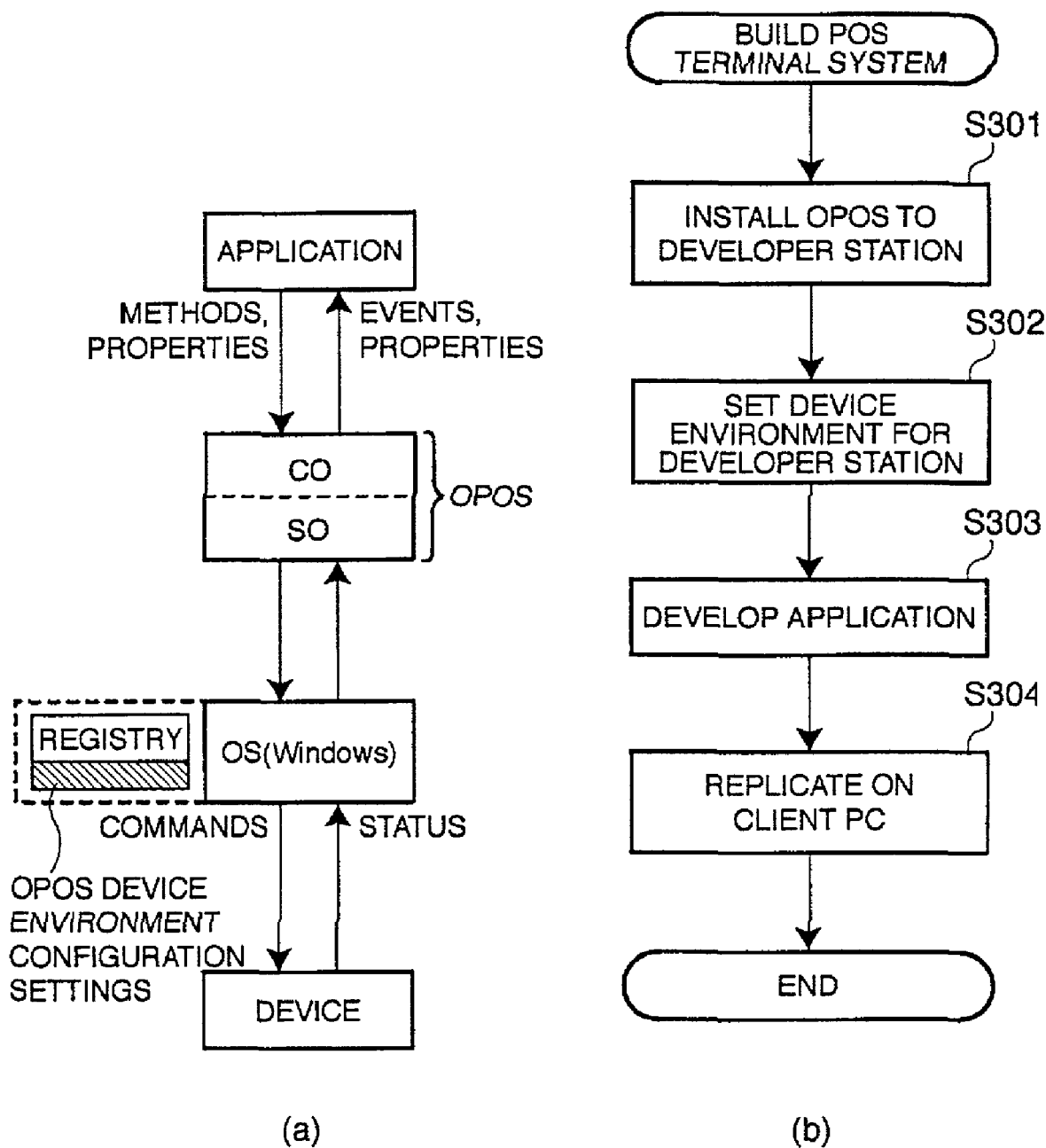
FIG. 3(a) shows where OPOS is positioned in a POS terminal system.
FIG. 3(b) is a flow chart of system development for a POS terminal system.

FIGS. 3(a) and 3(b) illustrate the role of OPOS in a POS terminal system. FIG. 3(a) shows where OPOS is positioned, and FIG. 3(b) is a flow chart of system development for a POS terminal system. As shown in FIG. 3(a), OPOS is located between the OS and the application controlling the devices in the POS terminal system, and provides a standardized interface for connecting the host computer (PC) and peripheral devices based on defined specifications.

OPOS has two layers, the control object (CO) and service object (SO) layers. The control object layer contains objects provided for each device class, such as printers and displays, and controls the device-application interface. The service object layer contains service objects provided for each device, such as for each printer model. The service objects control device operation by way of the OS. The OS also manages the registry where the OPOS device environment configuration settings used by OPOS are stored.

The application controls a particular device using methods and properties, and receives feedback about the result from the controlled device using events and properties. OPOS converts process requests from the application to commands supported by the device and sends the commands to the addressed device, and receives the device status indicating the process result from the device.

As shown in FIG. 3(b) building a POS terminal system involves four major tasks. First is installing OPOS to the host computer used for development (step S301). This computer is referred to as the "developer station." More specifically, this involves installing the control object and service object, creating an OPOS device environment configuration settings layer in the registry; the device class is then saved in this layer. The OPOS device environment configuration settings are then edited to match the devices used in the POS terminal system, and saved in the registry of the developer station (step S302). More specifically, a device profile is registered below the previously registered device class. A software application providing the desired functions of the POS terminal system is then developed on the developer station (step S303). The last step is to reproduce the application environment and application developed on the developer station on the host computers of the plural POS terminal systems of the POS system (these host computers are referred to below as client PCs) (step S304), thus completing the POS terminal system.

A device environment configuration system enabling the task shown as step S302 in the construction of a POS terminal system to be completed more efficiently, that is, the task of editing the OPOS device environment configuration settings to match the devices used in the POS terminal system and saving these settings in the registry, is described below according to the present invention.

Figure 4:
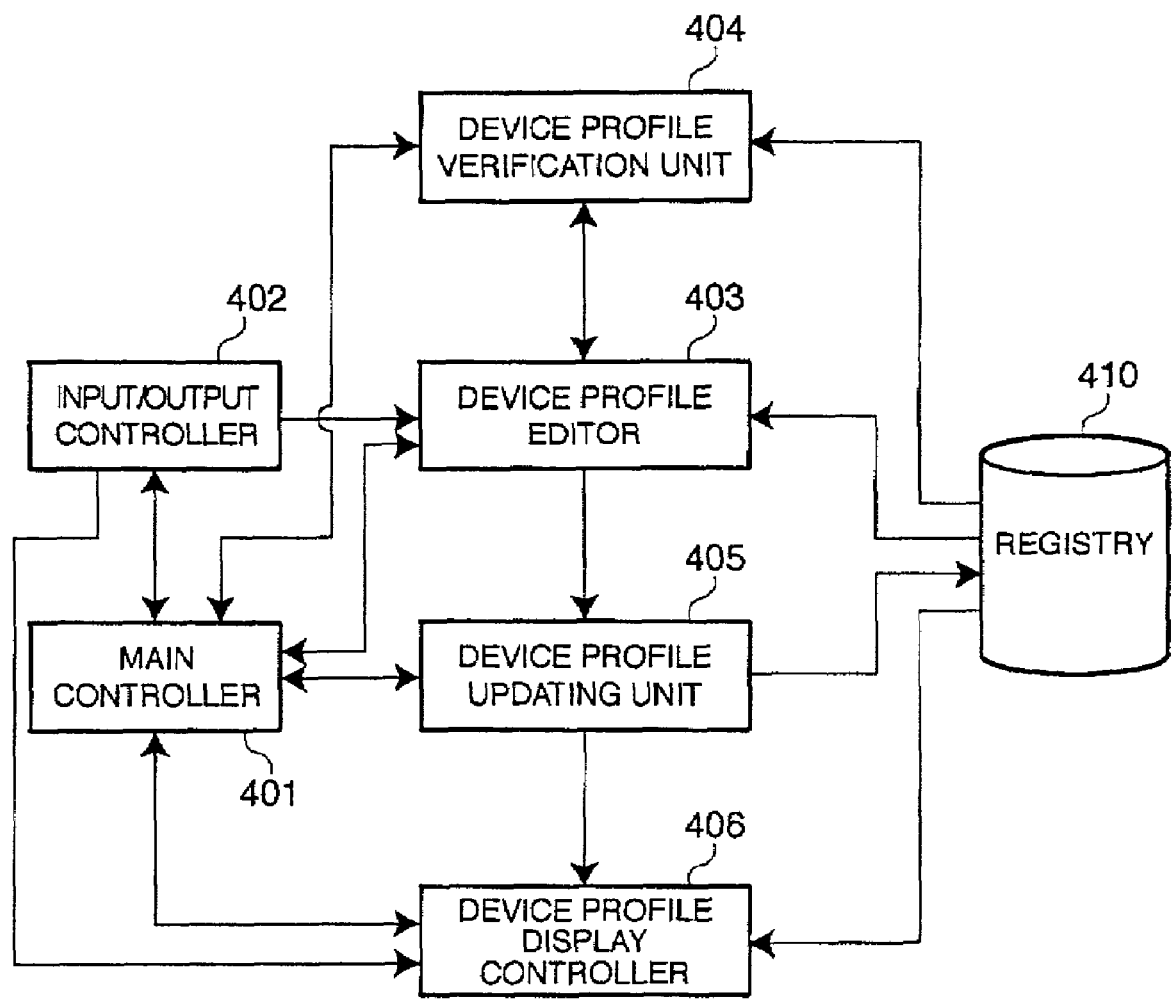
FIG. 4 is a block diagram for a device environment configuration system.

FIG. 4 is a function block diagram of this device environment configuration system. The various functions are described below. As shown in FIG. 4 this device environment configuration system has a main controller 401, input/output controller 402, device profile editor 403, device profile verification unit 404, device profile updating unit 405, and device profile display controller 406.

The input device 402 inputs the device profiles for setting the OPOS device environment configuration settings in the registry 410 to match the connections of the devices in the POS terminal system. The device profiles are input using a keyboard, mouse, or other input device not shown in the figures.

The device profile editor 403 relates the data input by the input/output controller 402 to a device profile, if any, previously stored in the OPOS device environment configuration settings in the registry 410, and thus edits individual device profiles in the OPOS device environment configuration.

The device profile verification unit 404 determines whether the device profile edited by the device profile editor 403 is appropriate based on the OPOS device environment configuration settings in the registry 410. If the profile is not appropriate, a warning is passed to the device profile display controller 406 to be displayed, and the device profile editor 403 is instructed to re-edit the edited device settings until the data is appropriate.

Based on the device profile edited by the device profile editor 403, the device profile updating unit 405 then updates the OPOS device environment configuration settings in the registry 410.

On a display device not shown in the figures, the device profile display controller 406 presents a device tree organized by device class or port based on the OPOS device environment configuration settings in the registry 410, and using the property function displays device profiles, including detailed information about a device and various settings. The device profile display controller 406 can also display a map of device connections (hydra connection). As further described below, a hydra connection is a method for connecting plural devices to a single port.

The main controller 401 controls and arbitrates operation of the input device 402, device profile editor 403, device profile verification unit 404, device profile updating unit 405, and device profile display controller 406.

A summary of the device environment configuration system process is described next with reference to the flow chart thereof in FIG. 5. When the program for the device environment configuration process starts, the first step is to display the main screen for configuring the device environment (step S501), and then detect what input was received (step S502).

Figure 11:
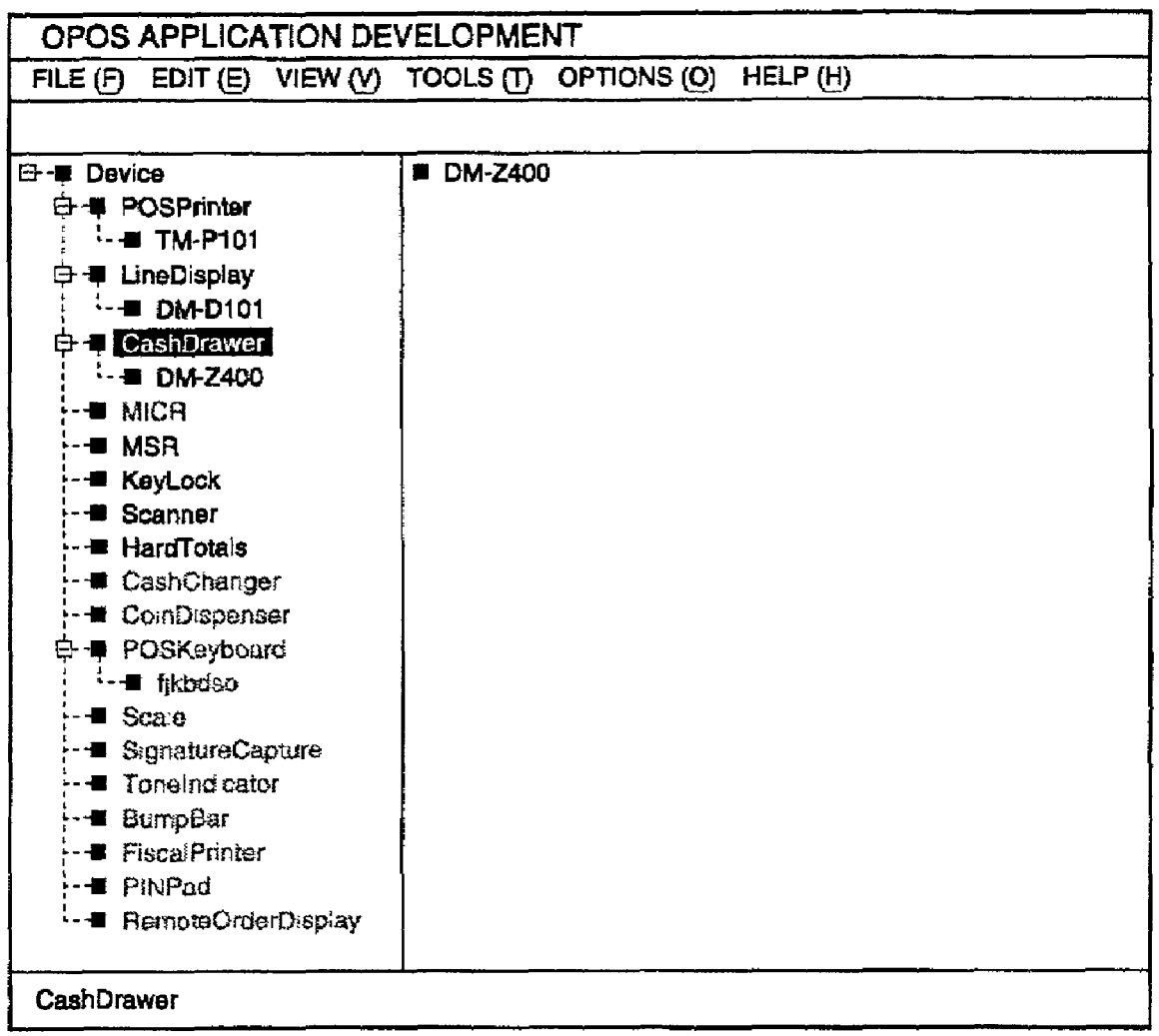
FIG. 11 is an example of a device class display screen.

If the input is to display a device profile (step S502 returns "display"), the OPOS device environment configuration settings in the registry 410 are displayed according to the input data (step S503), and the procedure loops back to step S501 to display the main screen and wait for the next input. If the input was to display the device profiles organized by device class, for example, the devices are displayed grouped by the device class, such as printers and displays, as shown in FIG. 11.

If the input is to add device information (step S502 returns "add"), the device information input via the input device is related to the previously registered OPOS device environment configuration settings in the registry 410 so that the settings for the particular device can be edited (step S504), the settings are then verified for applicability (step S505), a process for adding the edited data to the OPOS device environment configuration settings in the registry 410 is run (step S506), and the procedure loops back to step S501 to display the main screen and wait for the next input.

If the input is to delete device information (step S502 returns "delete"), the device information input from the input device is related to the previously registered OPOS device environment configuration settings in the registry 410 and edited (step S507), then verified (step S508), and a process for deleting the information from the OPOS device environment configuration settings in the registry 410 is then run (step S509). Next, the procedure loops back to step S501 to display the main screen and wait for the next input.

If the input is to change device information (step S502 returns "change"), the device information input from the input device is related to the previously registered OPOS device environment configuration settings in the registry 410 and edited (step S510), then verified (step S511), and a process for changing the OPOS device environment configuration settings in the registry 410 based on the changed data is run (step S512). Next, the procedure loops back to step S501 to display the main screen and wait for the next input.

If the input is for an operation other than to edit device information as described above (step S502 returns "other"), the corresponding process is run (step S513), and the procedure then loops back to step S501 to display the main screen and wait for the next input.

Figure 13A:
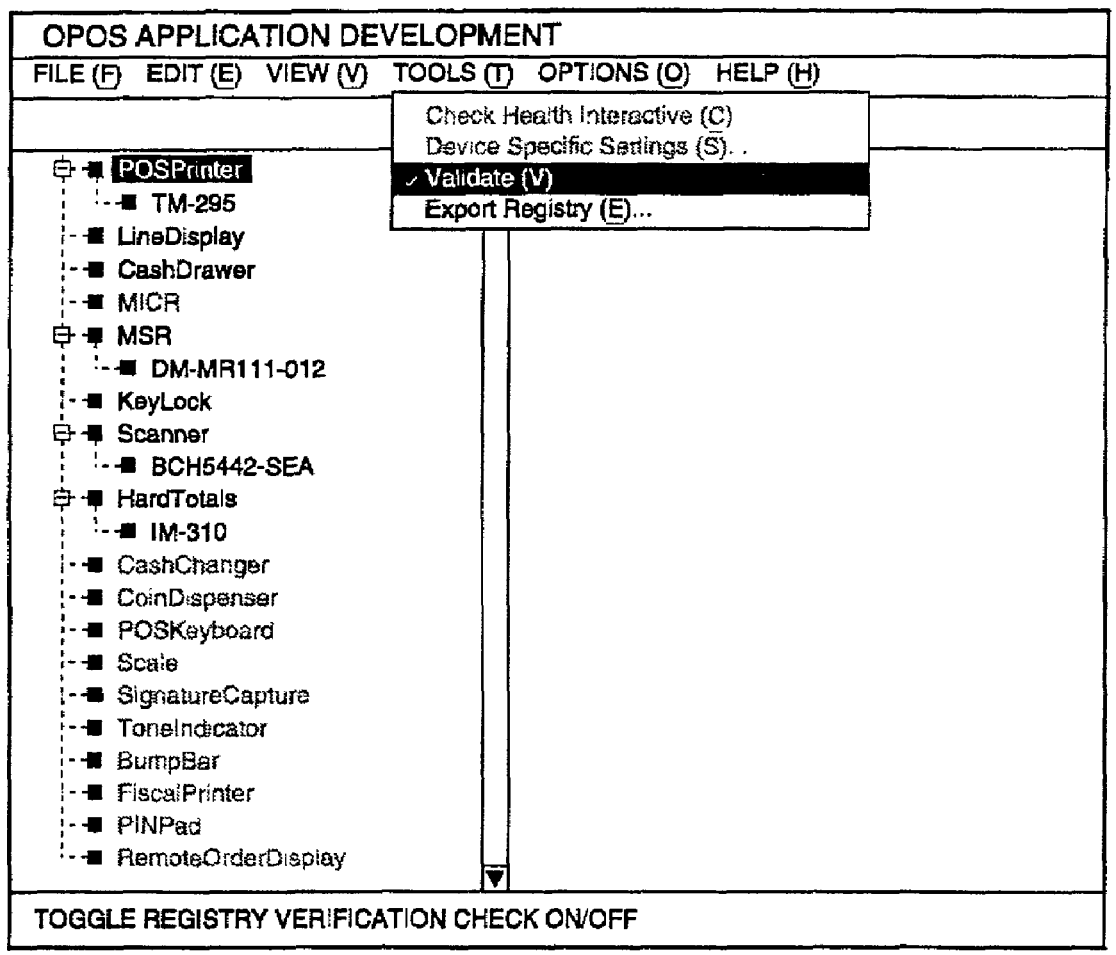
FIG. 13(a) shows selecting the verification process.
Figure 13B:
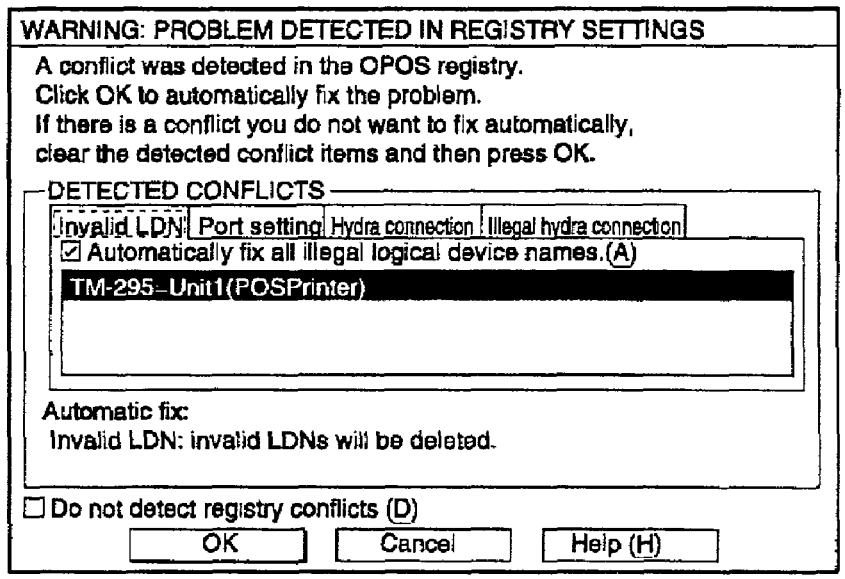
FIG. 13(b) shows a warning displayed by the verification process.

Data is verified in steps S505, S508, and S511 by selecting a verification process as shown in FIG. 13(a). When the verification process detects a problem, a screen such as shown in FIG. 13(b) is displayed. The user can choose to use an auto-correct function to automatically change the setting to a valid setting. The user can also deselect the verification process so that this process is not run.

The steps in the device environment configuration process are described in further detail below. FIG. 6 is a flow chart of the display process shown as step S503 in FIG. 5.

The first step (S601) is to determine whether to display device connections, a list of all devices, or a device profile (device details and settings). If displaying device connections is selected (S601 returns "device tree"), what type of tree to display is determined (S602).

If a device class tree display is selected (S602 returns "device class"), that is, if the user selects Device Class View from the view menu of the main screen, the connected devices are displayed grouped by device class (S603). More specifically, the tree groups printers together, groups display devices together, and so forth. A typical device class tree is shown in FIG. 11. Device classes for which device information cannot be set (such as devices that are not provided but belong to an OPOS standard device class) can be indicated by changing the color or shade used to display those device classes.

The order of the device class display can also be switched between a standard view arranging the device classes in a predetermined sequence (such as from highest to lowest importance to POS system configuration), and an alphabetic sequence by device class name. The desired display sequence can be specified using a menu selection (standard order, order by name), for example.

Figure 14A:
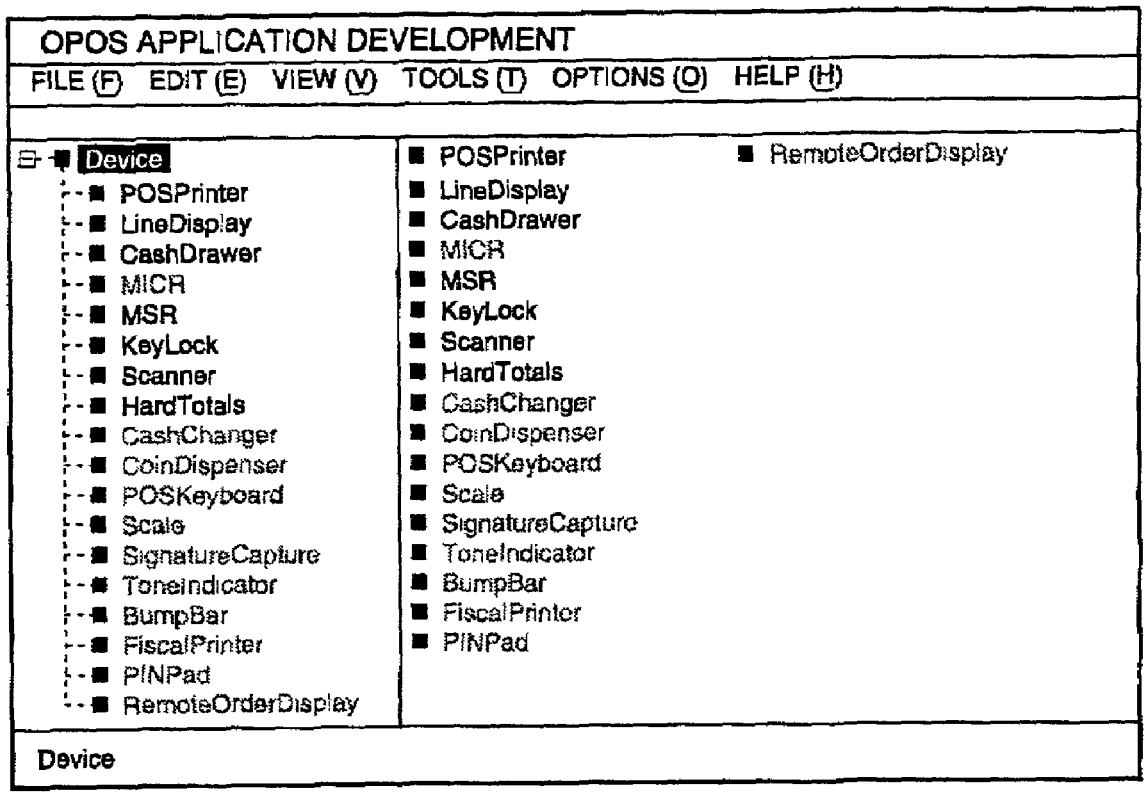
FIG. 14(a) shows a standard view of device information.
Figure 14B:
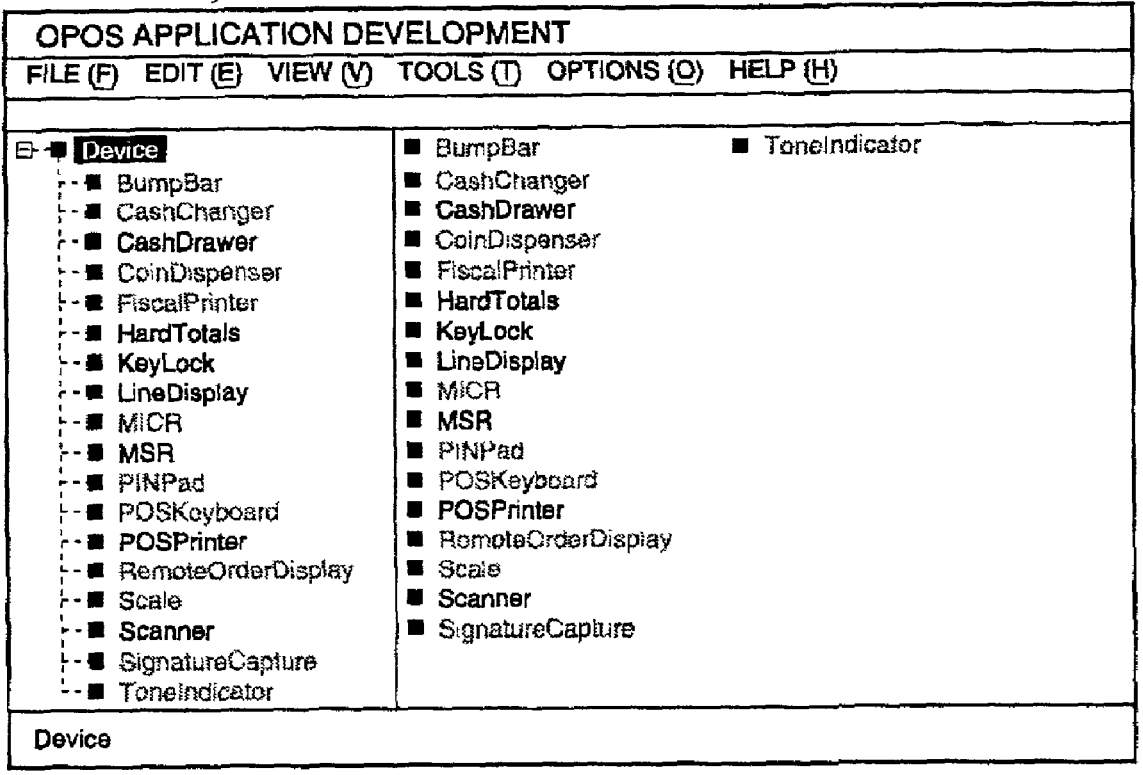
FIG. 14(b) shows a name view in alphabetic order.

FIG. 14(a) shows devices displayed in a standard order, and FIG. 14(b) shows the devices arranged by name. Note that FIG. 11 and FIGS. 14(a) and (b) show the trees in expanded form, but the tree is collapsed when the device class tree or port tree is first displayed.

If the user selects a connection port tree view (S602 returns "port"), that is, if the user selects Port Connection View from the view menu of the main screen, the ports are searched to detect the hydra connection map from the device information (S604).

A hydra connection is a method of connecting plural devices to a single port, and can take two forms: pass-through connection or Y connection. FIG. 12(b) shows the physical arrangement of pass-through and Y connections. With a pass-through connection data flows from the host computer (PC) to the receive buffer of the customer display (LineDisplay), and only the data for the printer (POS printer) is then passed from the LineDisplay to the printer. With a Y connection the data is sent simultaneously from the host computer to both the customer display and printer.

The devices are then displayed based on the device connection data thus detected for each port, that is, in order of physical proximity to the host computer (S605). FIG. 12(a) shows a typical display of the devices organized by connection port. The hydra connection of devices to serial interface ports COM1 and COM2 can be easily visually confirmed.

If displaying all devices is selected (S601 returns "all devices"), that is, the user selects View All from the view menu, all device classes and all devices in the POS terminal system in the device class or connection port display trees shown by steps S602 to S605, are displayed (S606). More specifically, this option expands all branches of the device tree as shown in FIG. 11 and FIGS. 14(a) and (b).

Figure 15:
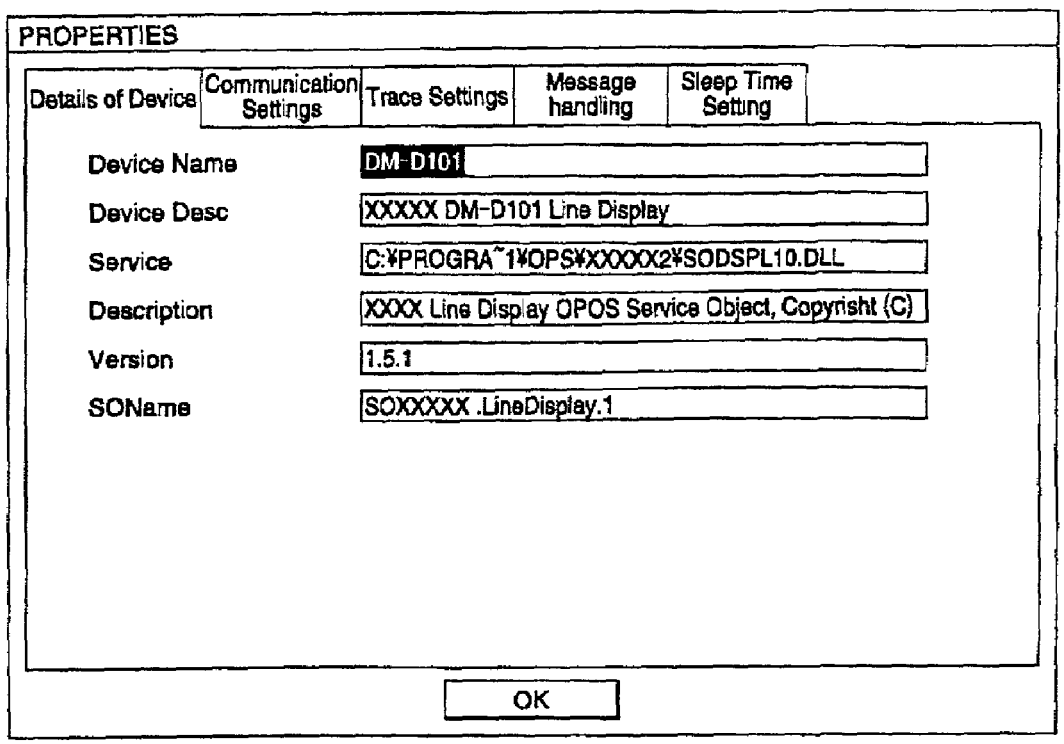
FIG. 15 is an example of a screen showing detailed device information using the device property function.

If displaying device properties including details about and settings for the devices is selected (S601 returns "properties"), that is, the user selects Property from the right-click menu of the selected device, a dialog box showing the settings of the selected device is displayed in a tab format using the object property function (S607). An example of the device property dialog box is shown in FIG. 15. This example shows the properties for the customer display device DM-D101.

Figure 7:
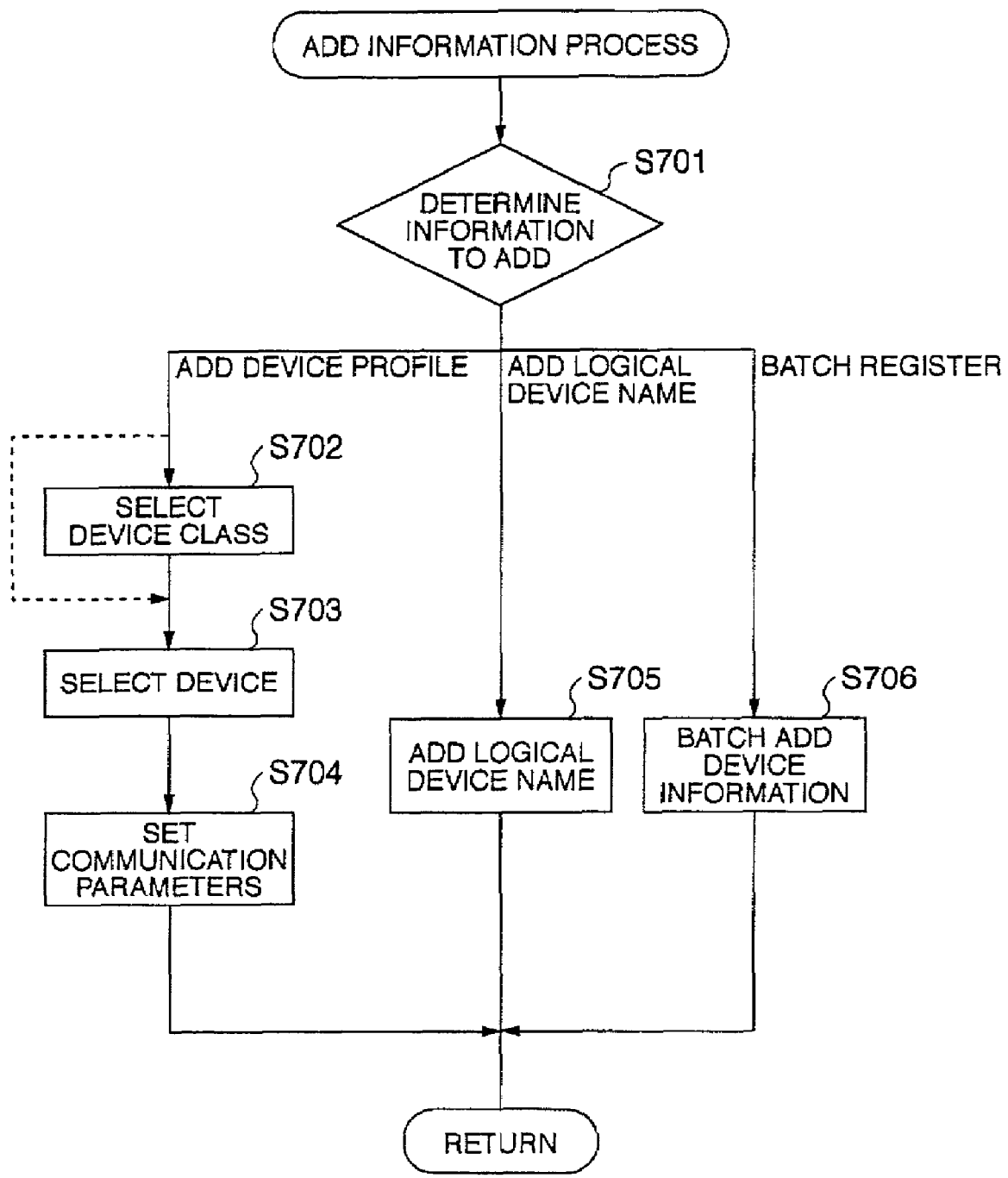
FIG. 7 is a flow chart of the add routine in the device environment configuration process.

FIG. 7 is a flow chart of the routine for adding information (S504 in FIG. 5) as part of the device environment configuration process. This add routine is run when selected from the edit menu of the main screen or from the right-click menu of a device class or device. The first step is determining what device information to add (S701). When Add New Device is selected from the edit menu of the main screen (S701 returns "add device"), device information is added using a wizard. In this case a device class selection screen is presented (S702), a device selection screen is presented (S703), and a device communication parameter configuration screen is presented (S704) to prompt the user for information. A device profile is then added based on the information input to the displayed screens. It will be noted that a wizard is a method of prompting the user for information while also offering guidance concerning what operations to perform.

Figure 16:
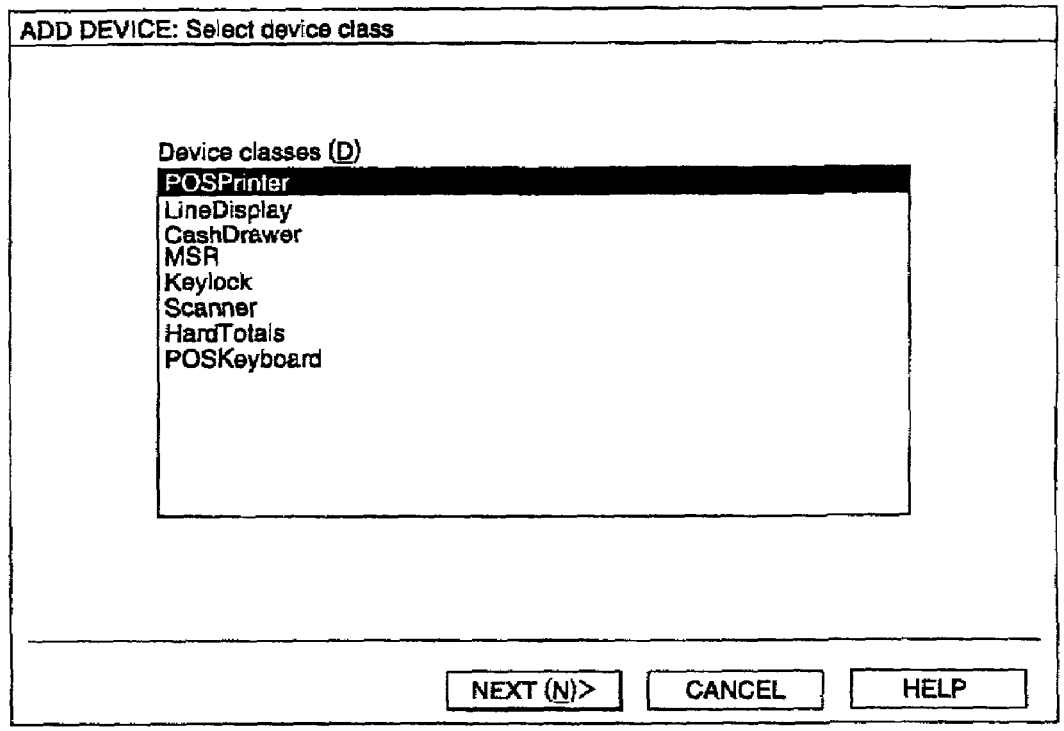
FIG. 16 shows a device class selection screen.

FIG. 16 shows a typical device class selection dialog box, FIG. 17 shows a device selection dialog box, and FIG. 18 shows a device communication parameter dialog box. Using these dialog boxes the user selects, for example, the "printer" device class, selects the printer model, and then inputs the printer-specific communication parameters to add device information.

The wizard can also provide a device function test called "Check Health" (such as test print if the device is a printer) and set up device-specific parameters (such as set the paper size if the device is a printer) as shown in FIG. 18.

A device can also be added without using a wizard. If a device class tree is displayed in the main screen and the user selects adding a device by right-clicking on the device class of the device to add, the device class selection screen is skipped so that the user can start from the device selection dialog box. For example, if "printer" is selected as the device class from the main screen and the user then right clicks to add a device, adding device information can start from the device selection screen for printers.

If the connection port tree is displayed in the main screen, the user selects the port to which the device is connected, and then right clicks to add a device, the device class selection screen must be displayed but the default settings for the selected port can be shown in the device selection screen. For example, if a USB port is selected in the main screen as the port to which a device will be connected, and "add device" is selected by right clicking on the port, "USB" is indicated as the default port in the device selection screen.

If the user selects adding a Logical Device Name for a device (S701 returns "add logical device name") as a result of the user selecting Add New LDN from the edit menu of the main screen, or selects the device for which to add a name and then right clicks and selects Add New LDN, a dialog box for adding a logical device name is displayed. This dialog box prompts the user for device name input, and then adds the name to the selected device (S705). FIG. 19 shows a typical dialog box for adding a device name.

If the user selects batch registering devices to a POS terminal integrating a host computer with printer, and other peripheral devices (S701 returns "batch register") by selecting Batch Settings from the edit menu of the main screen, a screen for match registering all devices connected to the POS PC is displayed. This screen prompts the user to input the configuration, and then adds the device information based on the user-defined settings (S706). A typical dialog box for batch registering plural devices is shown in FIG. 20.

Figure 8:
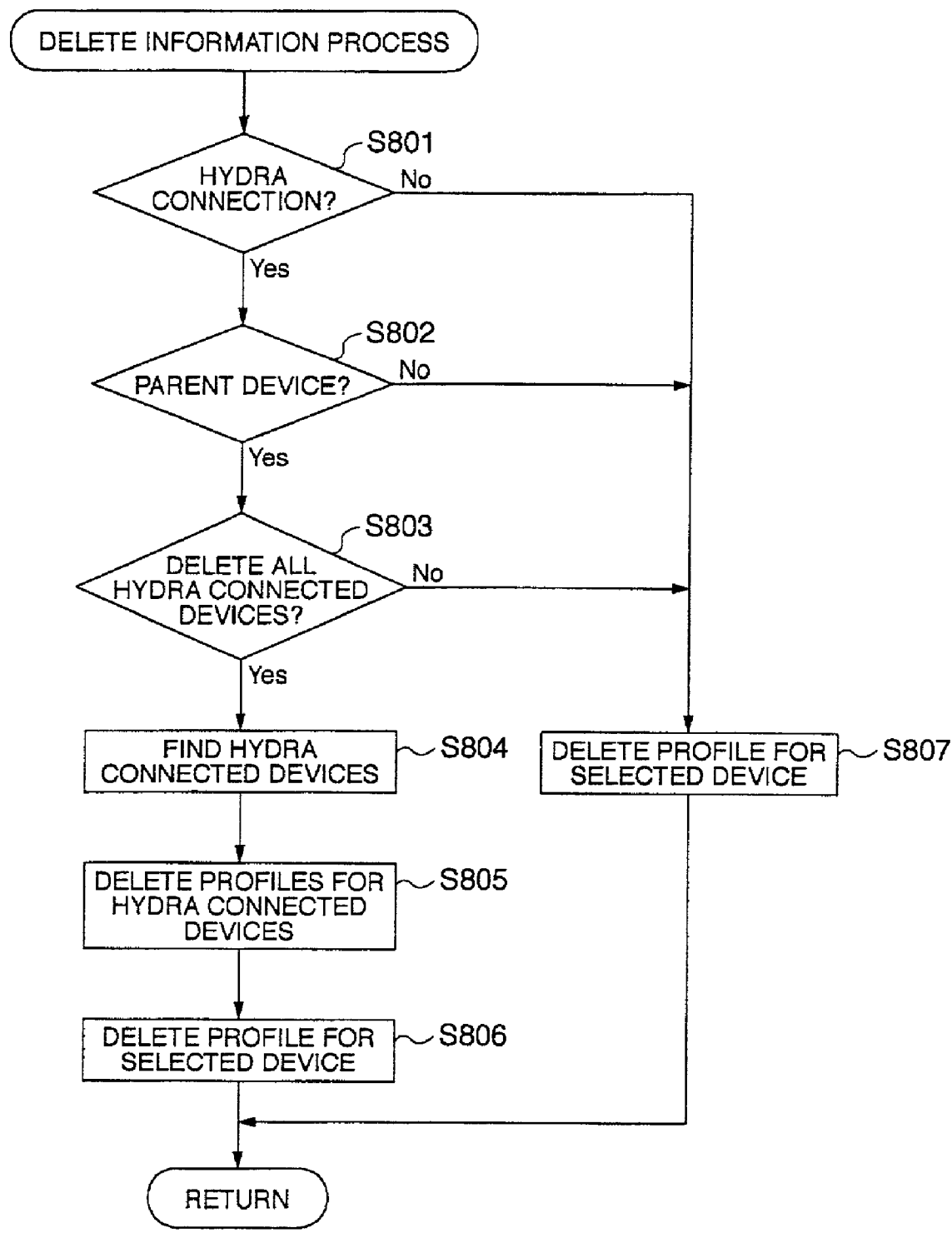
FIG. 8 is a flow chart of the delete routine in the device environment configuration process.

FIG. 8 is a flow chart of the delete routine (S507 in FIG. 5) in the device environment configuration process. The delete routine is run by selecting Delete from the edit menu of the main screen after first selecting the device to delete, or right clicking on the device and selecting Delete from the pop-up menu. The first step in this routine is to determine if the selected device is a hydra connected device based on the connection profile of the selected device (S801). If the device is a hydra connected device (S801 returns yes), whether the device is a parent or child is detected (S802). If it is a parent device (S802 returns yes), the user is asked whether to delete all connected devices including the child devices (S803).

If the user says to delete all devices (S803 returns yes), all child devices connected to the selected parent device are found (S804), the device information for all identified devices is deleted (S805), and the device information for the selected parent device is then deleted (S806).

If deleting all devices connected to the selected device is not selected (S803 returns no), only the device information for the selected device is deleted (S807). In this case the children connected to the deleted parent device are connected directly to the port to which the parent device was connected, and this new connection status is reflected in the device information, which is updated for each child device.

If the hydra connected device is a child device (S802 returns no), the device information for the selected device is deleted (S807). If the selected device is not hydra connected (S801 returns no), the device information for the selected device is deleted (S807).

Figure 21:
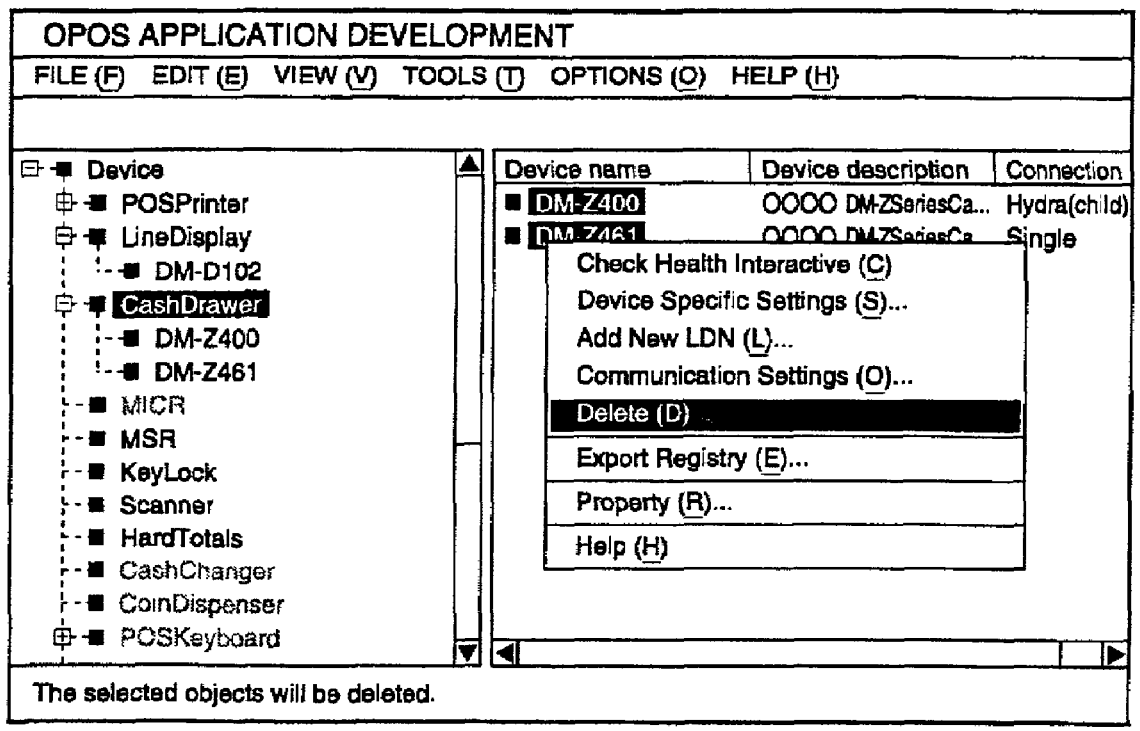
FIG. 21 shows deleting a device that is not hydra connected.

FIG. 21 shows a typical screen for deleting a device that is not hydra connected, and FIG. 22 shows a screen for deleting a hydra connected device. As shown in FIG. 21, plural devices can be selected and all selected devices can then be deleted. As shown in FIG. 22, a parent device can be selected to delete both the parent and all children connected thereto.

Figure 5:
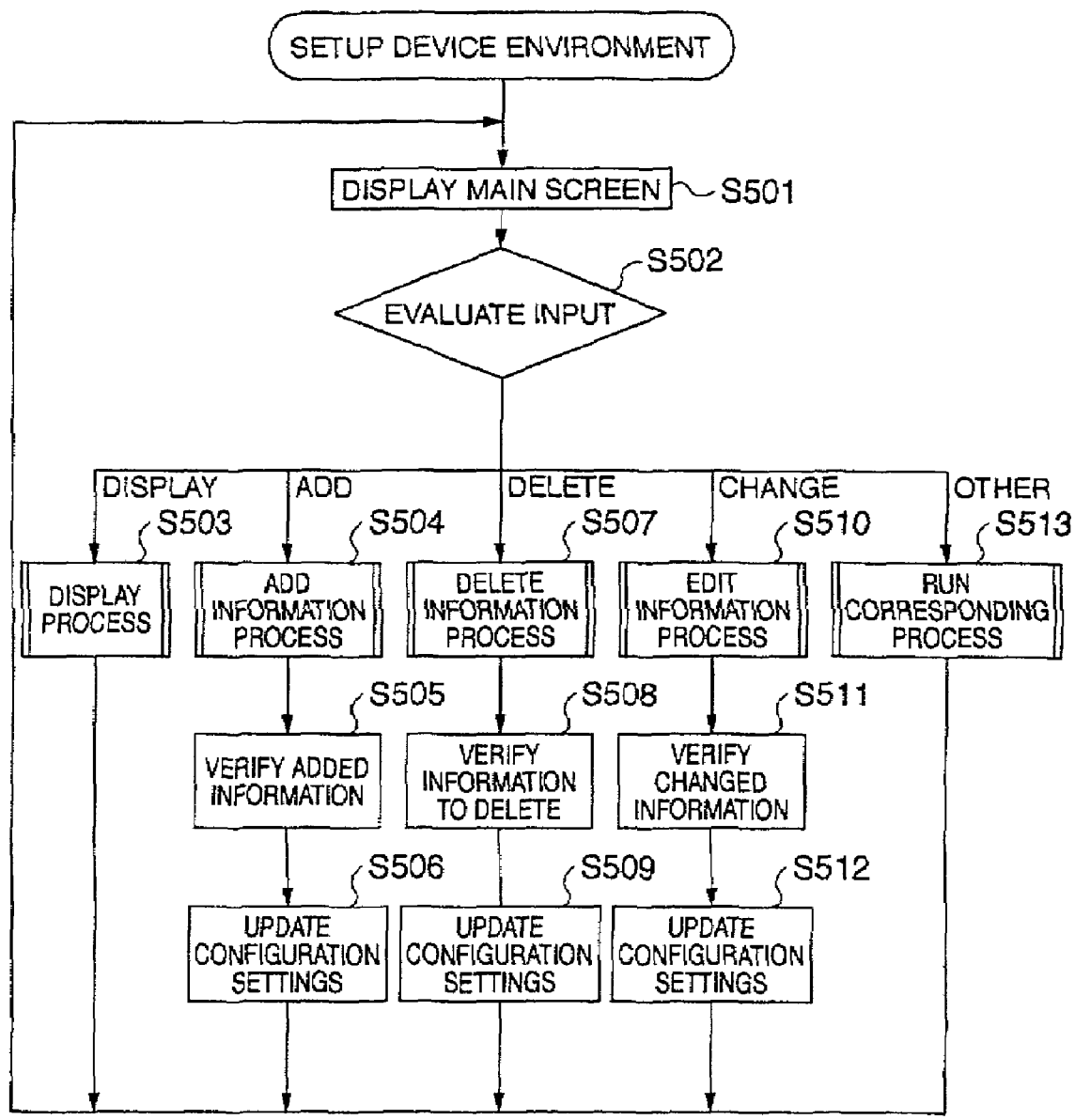
FIG. 5 is a flow chart of the device environment configuration process.
Figure 6:
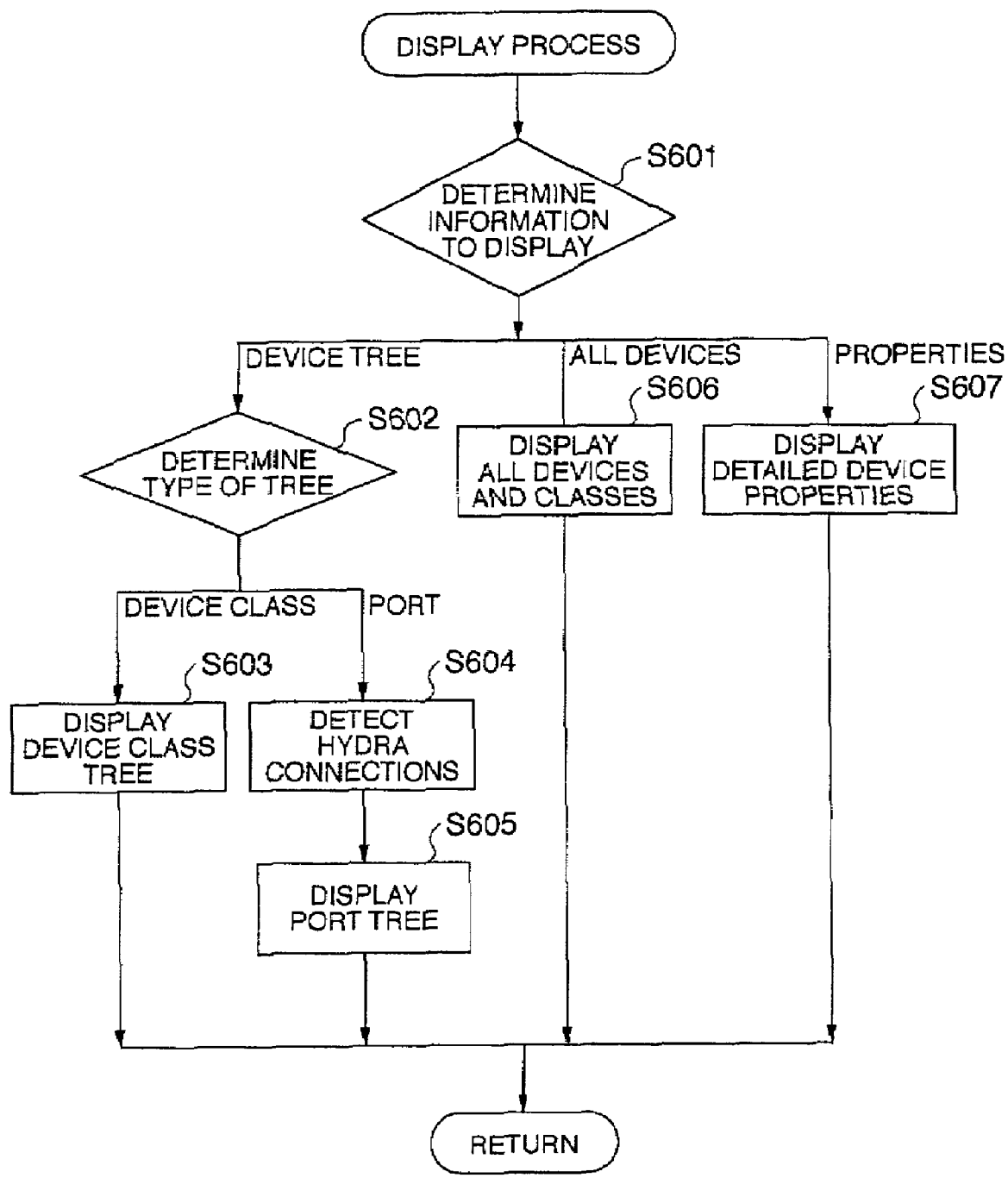
FIG. 6 is a flow chart of the display routine in the device environment configuration process.
Figure 9:
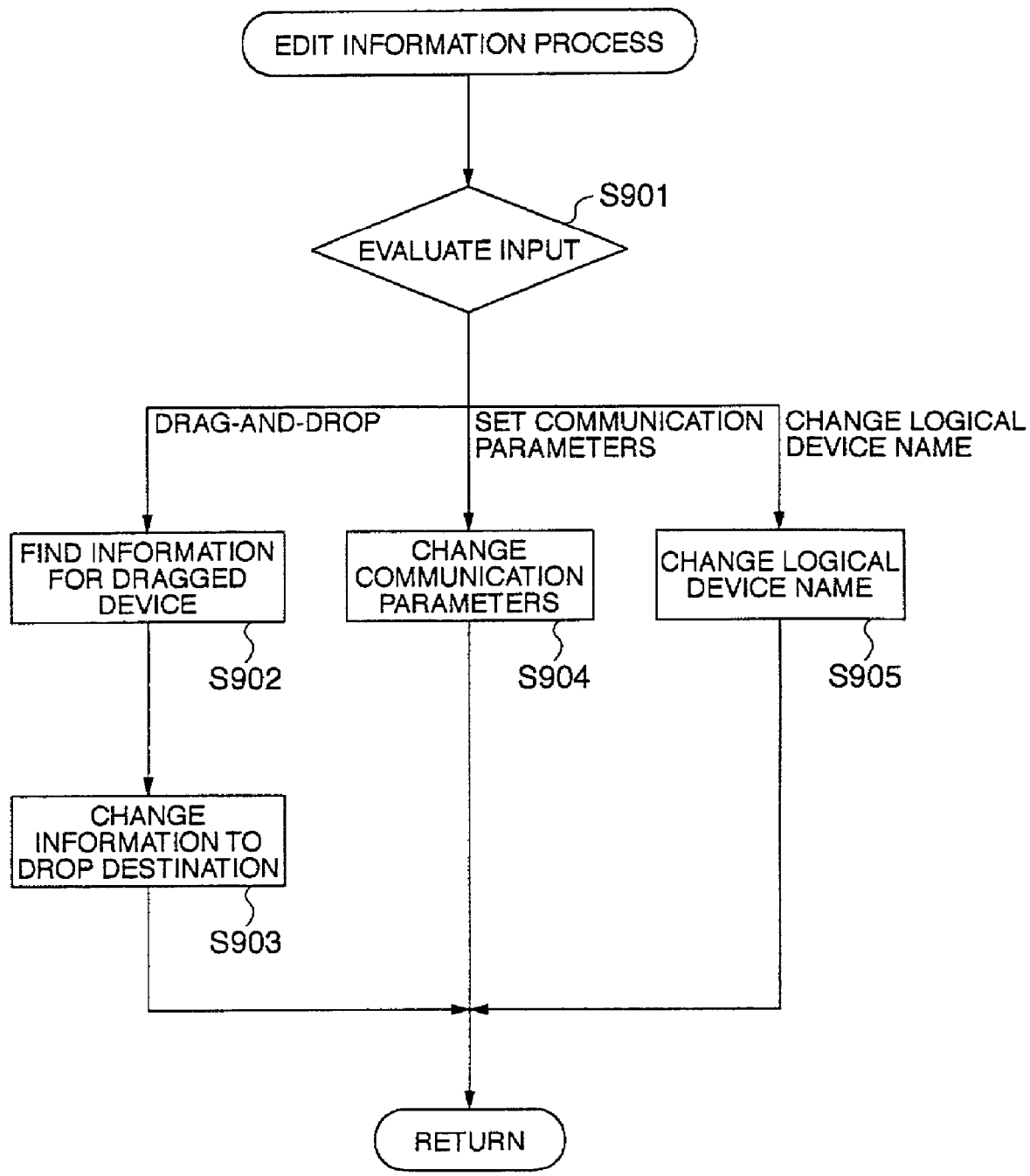
FIG. 9 is a flow chart of the change information routine in the device environment configuration process.

FIG. 9 is a flow chart of the routine for changing (editing) device information shown as step S510 of the device environment configuration process in FIG. 5. The first step is to evaluate the input for changing the registered device information (S901). If device port information is changed by drag-and-drop editing (S901 returns "drag-and-drop"), the device information for all devices connected to the port where dragging started is found (S902). The device information for all devices found connected to that port is then changed according to the port where the object is dropped (S903).

Figure 23A:
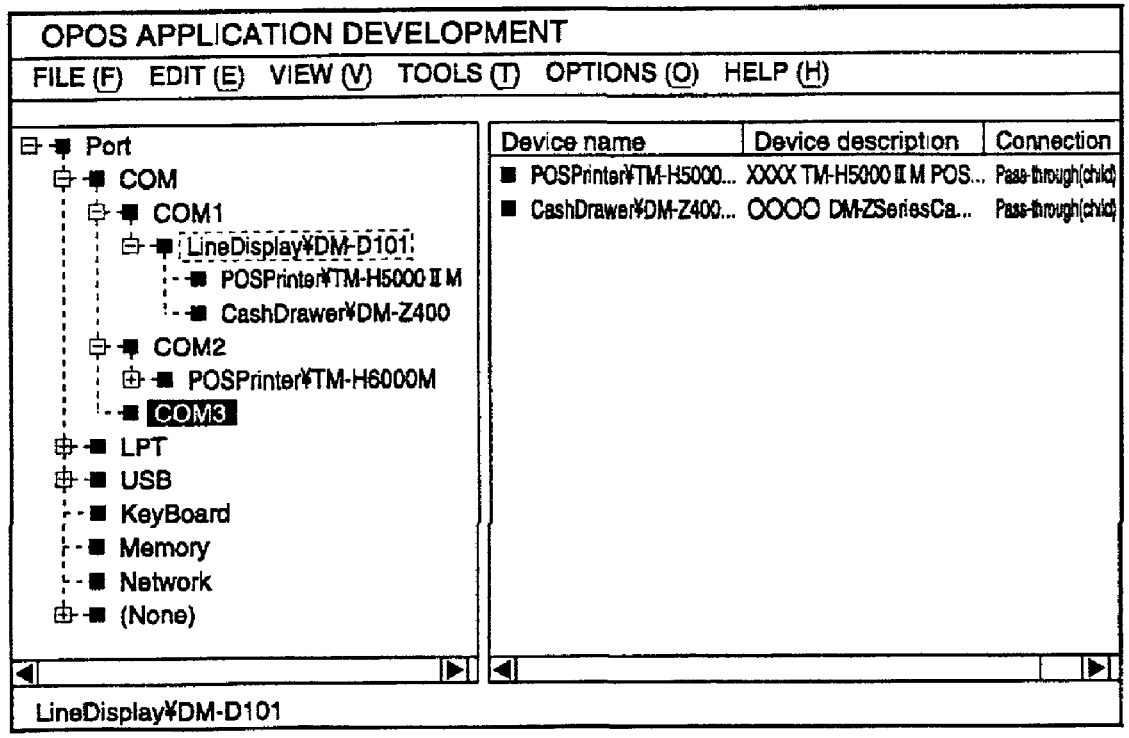
FIG. 23(a) shows device connections before changing device connection port information with a drag-and-drop function.
Figure 23B:
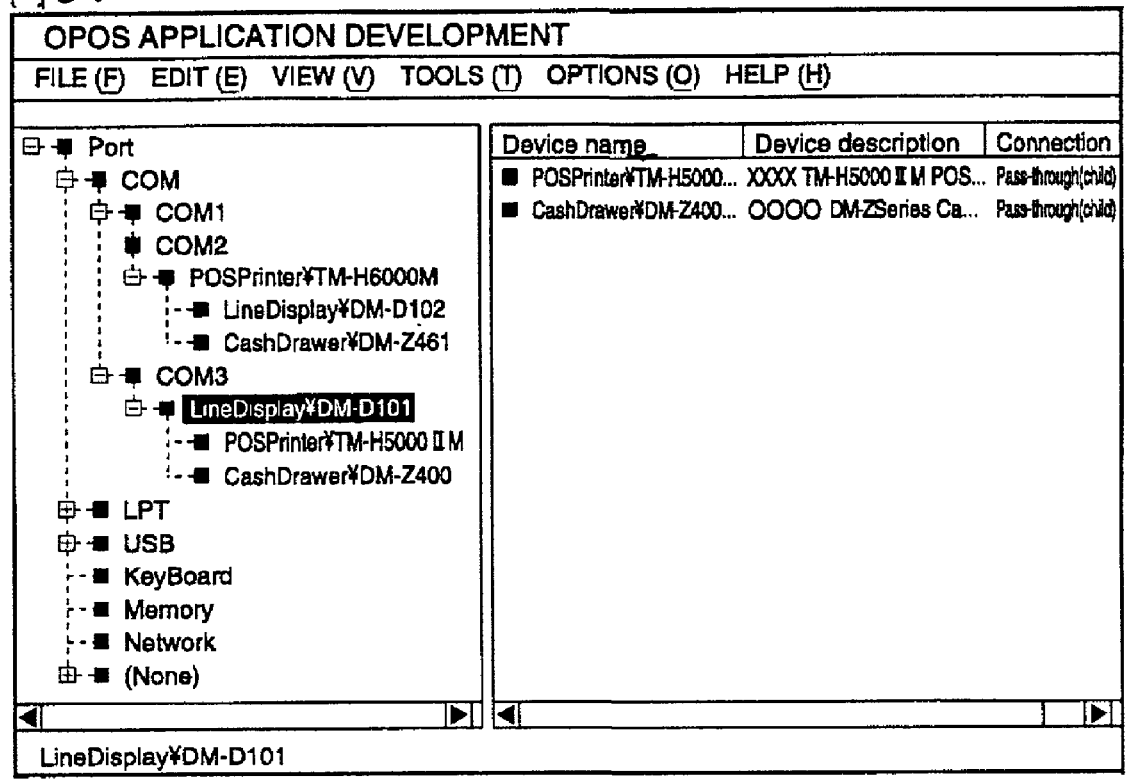
FIG. 23(b) shows device connections after the change.

FIGS. 23(a) and (b) show an example of changing port information by dragging a device from one port and dropping it on another. FIG. 23(a) shows the connections before the port is changed, and FIG. 23(b) shows the devices connected to each port after the device is dropped on a different port to change the connection.

As will be known from FIGS. 23(a) and (b), changing the port to which LineDisplay (a parent device) is connected from COM1 to COM3 also changes the connection for the child devices connected to the LineDisplay, that is, POSPrinter and CashDrawer, from COM1 to COM3. It should be noted that cut and paste editing can be used instead of drag-and-drop. If cut and paste is used the cut and paste operations can be controlled from the edit menu or using keyboard shortcuts.

If the selected device is a child, it is possible to move just the child, and if a device that can be a child is moved to a port to which a device that can be a parent is connected, then the child device can be hydra connected to the parent.

If the communication settings of the selected device are to be changed (S901 returns "communication settings") and the user selects Communication Settings from the edit menu of the main screen or by right clicking on a device object, a communication settings dialog box is displayed (substantially the same as the dialog box shown in FIG. 18). The user can then change the communication settings for the selected device (S904). It is also possible as part of this process to verify the communication settings and enter device-specific settings.

If the logical device name of the selected device is to be changed (S901 returns "logical device name") by selecting Rename LDN from the edit menu of the main screen or right clicking on the selected device, a dialog box for changing the logical device name is displayed (substantially the same as the screen shown in FIG. 17). The user can then input the desired name (S905) to change the logical device name of the selected device.

Figure 10:
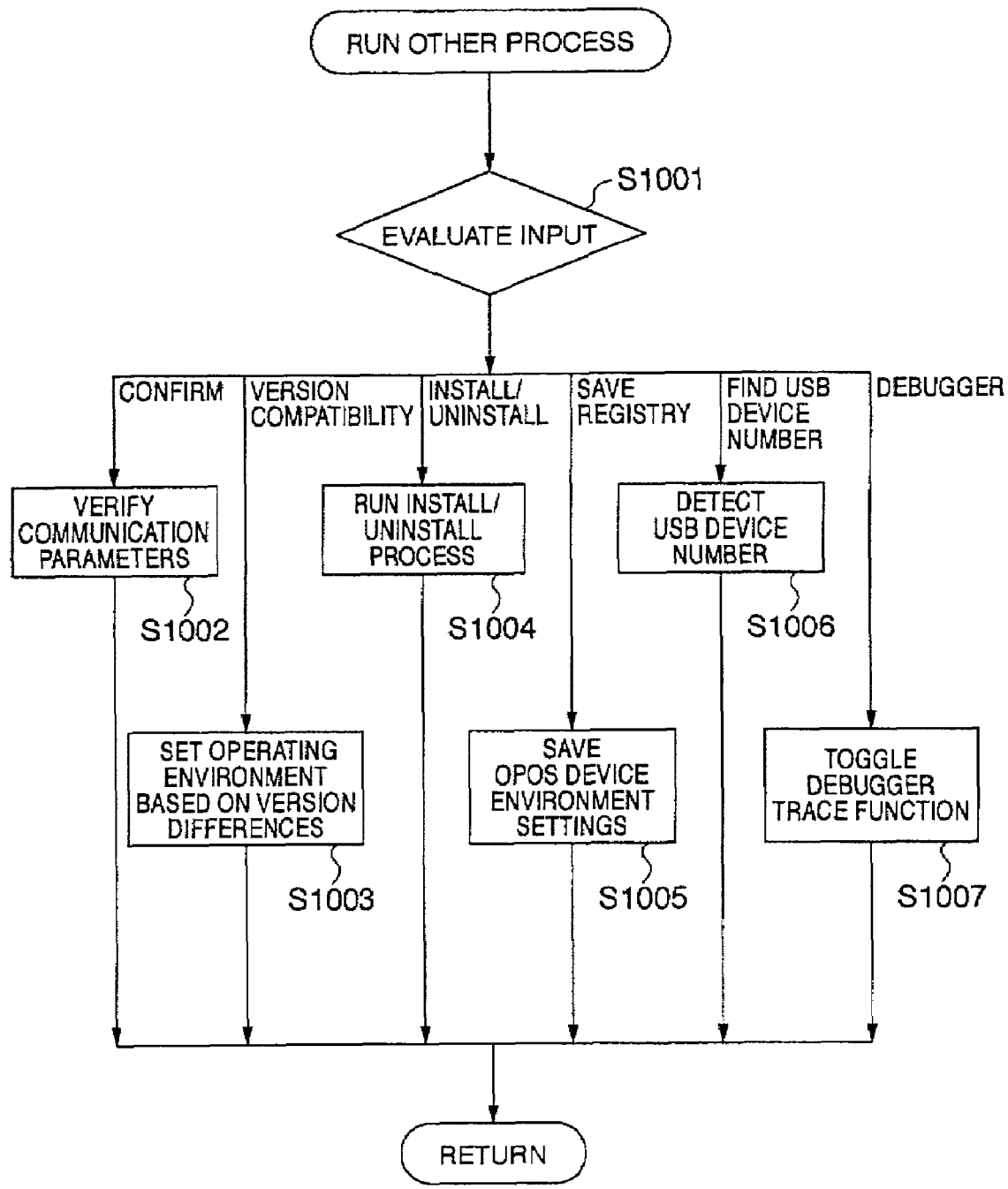
FIG. 10 is a flow chart of the routine for handling other operations in the device environment configuration process.

FIG. 10 is a flow chart for handling processes other than those described above within the device environment configuration process. The first step is to evaluate the input (S1001). If confirming the communication settings is indicated (S1001 returns "confirm") as a result of selecting Check Health Interactive from the tools menu of the main screen, for example, a routine to check for illegal port connections illegal communication settings, and whether communication is possible using the communication settings is run (S1002). It is also possible to prevent illegal port connections when a device is added to a specific port or a device is changed to a different connection port by confirming the connection settings, such as whether a hydra connection is used. Devices can also be connected without any such confirmation. Connection to illegal ports can also be prevented by defining the ports that can be used.

If the input is a version compatibility setting (S1001 returns "version compatibility") as a result of selecting Version Compatibility from the options menu of the main screen, for example, settings are made to absorb differences in operation resulting from different versions of the application controlling various OPOS functions (S1003). For example, if the application was written for an older version of OPOS but can still be used under a newer version of OPOS with changed or new functions, settings can be made to operate according to the old version.

If an installer or uninstaller is started (S1001 returns "start installer/uninstaller"), and Change Component to change the configuration is selected from the options menu of the main screen, an installer/uninstaller is run to change the configuration or change the version of an OPOS function by adding, changing, or deleting OPOS functionality (S1004).

If a command is applied to save the registry (S1001 returns "save registry") by selecting Export Registry from the tools menu of the main screen, for example, the OPOS device environment configuration settings are exported from the registry and saved to a data storage medium (S1005). This task is needed because the OPOS device environment configuration settings are needed to install the OPOS functions developed on the developer station onto the client PC.

If the input command is to detect the USB number (S1001 returns "detect USB number"), the USB number automatically assigned when a device is connected to a USB port is detected to relate the device and the USB number (S1006). Note that this function can also be applied to other communication protocols.

If the debugger is selected (S1001 returns "debugger") by selecting OPOS API Trace from the options menu of the main screen, the trace function can be toggled on and off for saving OPOS method and property values as the program runs to a specific file (S1007).

If the program functions of this device environment configuration system are assigned to steps in the flow chart of the device environment configuration process shown in FIG. 5, the device information display step corresponds primarily to steps S501 and S503; the input step by step S502; the device profile editing step to steps S504, S507, and S510; the device profile verification step to steps S505, S508, and S511; and the device profile update step to steps S506, S509, and S512. The add device information step corresponds primarily to step S504; the delete device information step to step S507; and the change device information step to step S510.

A general purpose, practical device environment configuration method can be achieved by incorporating the program functions of the device environment configuration system described above into a computer.

It is noted that the present invention is not limited to the OPOS devices and can be applied to all other devices for using a computer.

Some advantages of the present invention are described below.

How devices in a POS terminal system are interconnected can be visually understood by the POS system developer by displaying a device tree organized by device class, connection port, or other category based on the OPOS device environment configuration settings stored in the registry. Detailed information about a selected device can also be displayed by a simple operation using the property function.

OPOS device environment configuration settings can be easily edited by, for example, using a set-up wizard to add all required settings to the device profiles of the devices in the POS terminal system; batch adding information for all devices in a POS terminal system integrating a host computer with peripheral devices; changing device information using a drag-and-drop function to simply move all device information for a device connected to the port where dragging starts to the port where the device information is dropped; and changing or deleting information for a specified device and the information for all devices connected to the specified device based on how the specified device is connected.

In other words, while observing the settings and setup of all devices in a POS terminal system, the user can edit the OPOS device environment configuration settings, verify the appropriateness of the edited OPOS device environment configuration settings, and save the confirmed, edited content to the registry. OPOS device environment configuration settings can also be edited according to how the devices of the POS terminal system are connected to each other.

Mistakenly changing registry data other than the OPOS device environment configuration settings can also be prevented.

The time required to develop an application providing functions for a POS terminal system is thus reduced, and an environment enabling efficient application development can be provided for system developers.

It will be apparent to those skilled in the art that various modifications and variations can be made in the battery and the method according to the present invention without departing from the spirit or scope of the invention. For example, although the flow of the process for setting up device environment and the corresponding display screens are described in detail in the flow charts and screen examples, they are merely examples and the invention is not limited to the particular method steps or screen appearances illustrated. Thus, it is intended that the present invention cover modifications and variations that come within the scope of the appended claims and their equivalents.

What is claimed is:

1. An apparatus for configuring a device environment for a system of one or more connected devices, each device having a device profile, the system running an operation system (OS), the apparatus comprising:

a device profile display controller for generating a display, based on a connection status of one or more devices in the system, of device profiles from system configuration information managed by the system OS in selected display groups; and a device profile setting section for writing a device profile for a device to the system configuration information so that the profile corresponds to the connection status of the device;

wherein the device profile setting section comprises:

an input/output controller for inputting information to be written to a device profile in the system configuration information based on connections of the devices displayed by the device profile display controller;

a device profile editor for editing the device profile based on information inputted by the input/output controller;

a device profile verification unit for verifying the device profile edited by the device profile editor; and a device profile updating unit for updating a device profile in the system configuration information.

2. The apparatus of claim 1, wherein the device profile display controller displays one or more devices in the system in a device tree format according to selected display groups.

3. The apparatus of claim 2, wherein the display groups enable devices to be displayed by device class.

4. The apparatus of claim 2, wherein the display groups separate the devices by connection port, and display devices by connection status.

5. The apparatus of claim 1, wherein the device profile display controller displays the device profile for the device categorized by a parameter.

6. The apparatus of claim 1, wherein the device profile editor comprises:
a device profile generating section for adding a new device profile including a device identifier specifying a device in the system, and device communication parameters;
a device profile changing section for changing the device identifier and device communication parameters set in the device profile added to the system configuration information by the device profile generating section; and
a device profile deleting section for deleting a device profile added by the device profile generating section from the system configuration.

7. The apparatus of claim 6, wherein the device profile generating section adds the new device profile for a device in a specific sequence.

8. The apparatus of claim 6, wherein the device identifier specifying a particular device added by the device profile generator includes a logical device name for the device.

9. The apparatus of claim 6, wherein the device profile generating section batch adds devices to a system integrating plural devices of different device classes.

10. The apparatus of claim 6, wherein the device profile deleting section deletes all devices connected to a selected device based on the connection status of the selected device.

11. The apparatus of claim 6, wherein the device profile changing section batch changes the connection of a selected device connected to a port from which it is moved and the connection of all devices connected thereto to a port to which the selected device is moved.

12. The apparatus of claim 6, wherein the device profile changing section changes only a selected setting for a device.

13. The apparatus of claim 12, wherein the selected setting is a device communication parameter.

14. The apparatus of claim 12, wherein the selected setting is the logical device name of the device.

15. A method for configuring a device environment for a system of one or more connected devices, each device having a device profile, the system running an operating system (OS), the method comprising:
displaying, based on a connection status of one or more devices in the system, device profiles from system configuration information managed by the system OS in selected display groups;
writing a device profile for a device to the system configuration information so that the profile corresponds to the connection status of the device;
wherein the writing step comprises:
receiving input of information to be written to a device profile in the system configuration information based on connections of the devices displayed in the displaying step;
editing the device profile based on information inputted in the inputting step;
verifying the device profile edited in the editing step; and
updating a device profile in the system configuration information.

16. The method of claim 15, wherein the displaying step comprises displaying one or more devices in the system in a device tree format according to selected display groups.

17. The method of claim 16, wherein the display groups enable devices to be displayed by device class.

18. The method of claim 16, wherein the display groups separate the devices by connection port, and display devices by connection status.

19. The method of claim 15, wherein the displaying step comprises displaying device profile for the device categorized by a parameter.

20. The method of claim 15, wherein the editing step comprises one or more steps selected from a group consisting of:
adding a new device profile including a device identifier specifying a device in the system, and device communication parameters;
changing the device identifier and device communication parameters set in a device profile in the system configuration information; and
deleting a device profile from the system configuration.

21. The method of claim 20, wherein the adding step adds settings for a device in a specific sequence.

22. The method of claim 20, wherein the device identifier specifying a particular device added in the adding step includes a logical device name for the device.

23. The method of claim 20, wherein the adding step batch adds devices to a system integrating plural devices of different device classes.

24. The method of claim 20, wherein the deleting step deletes all devices connected to a selected device based on the connection status of the selected device.

25. The method of claim 20, wherein the changing step batch changes the connection of a selected device connected to a port from which it is moved and the connection of all devices connected thereto to a port to which the selected device is moved.

26. The method of claim 20, wherein the changing step changes only a selected setting for a device.

27. The method of claim 26, wherein the selected setting is a device communication parameter.

28. The method of claim 26, wherein the selected setting is the logical device name of the device.

29. A computer-usable medium storing computer program instructions for implementing the method as claimed in any of claims 15 to 28.

30. The computer-usable medium of claim 29, comprising a compact disc, a floppy disk, a hard disk, a magneto-optical disk, a digital video/versatile disc, a magnetic tape, or a semiconductor memory.

* * * * *